US010545944B2

(12) United States Patent
Ito (10) Patent No.: US 10,545,944 B2
(45) Date of Patent: Jan. 28, 2020

(54) INFORMATION PROCESSING APPARATUS FOR GENERATING STATISTIC INFORMATION TO RECOGNIZE WHEN AN UNSUCCESSFULLY-TRANSMITTED FILE EXISTS

(71) Applicant: CANON KABUSHIKI KAISHA, Tokyo (JP)

(72) Inventor: Yuki Ito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 15/276,134

(22) Filed: Sep. 26, 2016

(65) Prior Publication Data

US 2017/0093953 A1 Mar. 30, 2017

(30) Foreign Application Priority Data

Sep. 28, 2015 (JP) ................ 2015-189963

(51) Int. Cl.
*G06F 16/23* (2019.01)
*G06F 16/182* (2019.01)
*H04L 29/08* (2006.01)
*H04L 12/24* (2006.01)

(52) U.S. Cl.
CPC ........ *G06F 16/2358* (2019.01); *G06F 16/183* (2019.01)

(58) Field of Classification Search
CPC ... G06F 16/2358; G06F 16/183; H04L 67/02; H04L 41/0266
See application file for complete search history.

(56) References Cited

U.S. PATENT DOCUMENTS

| 9,800,455 | B1* | 10/2017 | Upshur | H04L 41/069 |
|---|---|---|---|---|
| 2005/0114505 | A1* | 5/2005 | DeStefano | G06F 17/2705 709/224 |
| 2006/0085697 | A1* | 4/2006 | Takeuchi | H04N 1/00344 714/50 |
| 2007/0038889 | A1* | 2/2007 | Wiggins | G05B 23/0264 714/20 |
| 2007/0285712 | A1* | 12/2007 | Komada | H04N 1/00204 358/1.15 |

(Continued)

FOREIGN PATENT DOCUMENTS

JP 2004-295303 A 10/2004
JP 2006107217 A 4/2006

(Continued)

*Primary Examiner* — Shirley X Zhang
(74) *Attorney, Agent, or Firm* — Canon U.S.A., Inc. IP Division (57) ABSTRACT

An information processing apparatus according to the present invention is directed to enabling recognition of omission of a log file in a case where a part of the log file is omitted when the log file of a log collection server is remotely checked, and the information processing apparatus includes a first transmission control unit configured to perform control to transmit log information to a log collection server, a generation unit configured to generate statistic information about transmission of the log information by the first transmission control unit, and a second transmission control unit configured to perform control to transmit the statistic information to the log collection server.

13 Claims, 12 Drawing Sheets

(56) References Cited

U.S. PATENT DOCUMENTS

| | | | | |
|---|---|---|---|---|
| 2008/0228937 A1* | 9/2008 | Araumi | ............... | H04N 1/00344 709/232 |
| 2010/0318653 A1* | 12/2010 | Watanabe | ........... | G06F 11/3006 709/224 |
| 2011/0149344 A1* | 6/2011 | Nakamura | .......... | G06F 11/0733 358/1.15 |
| 2011/0286035 A1* | 11/2011 | Uruma | .................. | G06F 3/1203 358/1.15 |
| 2012/0089568 A1* | 4/2012 | Manley | ................... | H04L 47/10 707/634 |
| 2013/0227358 A1* | 8/2013 | Yokokura | ........... | G06F 11/0733 714/57 |
| 2014/0376025 A1* | 12/2014 | Ito | ......................... | G06F 3/1273 358/1.14 |
| 2016/0285728 A1* | 9/2016 | Jhoney | ................ | H04L 43/0894 |
| 2017/0090837 A1* | 3/2017 | Homma | ................ | G06F 3/1205 |
| 2017/0279720 A1* | 9/2017 | Patnaik | ................... | H04L 47/12 |

FOREIGN PATENT DOCUMENTS

| | | | |
|---|---|---|---|
| JP | 2008140153 | A | 6/2008 |
| JP | 2008152664 | A | 7/2008 |
| JP | 2012103764 | A | 5/2012 |
| JP | 2015005082 | A | 1/2015 |

\* cited by examiner

| FILE NAME | WRITING TIME | TRANSMISSION TIME |
|---|---|---|
| LOG_PRINTER.TXT | 2013/5/30 20:03 | 2013/5/30 17:12 |
| LOG_FAX.TXT | 2013/5/30 20:03 | 2013/5/30 17:12 |
| LOG_USER.TXT | 2013/5/30 20:03 | 2013/5/30 17:12 |
| LOG_GENERAL.TXT | 2013/5/30 20:03 | 2013/5/30 17:12 |

```
<env:Envelope
xmlns:env="http://schemas.xmlsoap.org/soap/envelope/"
env:encodingStyle="http://schemas.xmlsoap.org/soap/encoding/">
<env:Body>
<ns:getLogCondition xmlns:ns="rdsgw">
<client>
<id>100</id>
<type>type A</type>
<appVersion>1.00</appVersion>
</client>
<device>
<mac>85:33:f2:2a</mac>
<ip>192.168.0.1</ip>
<serialNumber>serial:99345567</serialNumber>
<productName>real new device..</productName>
<type>type A</type>
</device>
</ns:getLogCondition>
</env:Body>
</env:Envelope>
```

702

```
<SOAP-ENV:Envelope xmlns:SOAP-
ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns:getLogConditionResponse xmlns:ns="rdsgw" SOAP-
ENV:encodingStyle="http://schemas.xmlsoap.org/soap/encoding/">
<available>1</available>
<url>http://172.24.177.1/webdav</url>
<id>aaaaaaaa</id>
<pass>bbbbbbbb</pass>
</ns:getLogConditionResponse>
</SOAP-ENV:Body>
</SOAP-ENV:Envelope>
```

FIG. 8

```
                                                    801
Start time         1403622653 (2014-06-25T00:10:53)
End time           1403623733 (2014-06-25T00:28:53)
Elapsed time       1080.328247391 sec
Success file(s)    10
Failed file(s)     2
Total file(s)      12
Total sent size    83886080 bytes
Last Result        0x00010002
```

```
<env:Envelope
xmlns:env="http://schemas.xmlsoap.org/soap/envelope/"
env:encodingStyle="http://schemas.xmlsoap.org/soap/encoding/">
 <env:Body>
  <ns:postOutcome2 xmlns:ns="rdsgw">
   <statistics>
    <StartTime>2014-06-25T00:10:53</StartTime>
    <EndTime>2014-06-25T00:28:53</EndTime>
    <ElapsedTime>1080.328247391</ElapsedTime>
    <SuccessFiles>10</SuccessFiles>
    <FailedFiles>2</FailedFiles>
    <TotalFiles>12</TotalFiles>
    <TotalSentSize>83886080</TotalSentSize>
    <LastResult>00010002</LastResult>
   </statistics>
  </ns:postOutcome2>
 </env:Body>
</env:Envelope>
```

1201

INFORMATION PROCESSING APPARATUS FOR GENERATING STATISTIC INFORMATION TO RECOGNIZE WHEN AN UNSUCCESSFULLY-TRANSMITTED FILE EXISTS

BACKGROUND OF THE INVENTION

Field of the Invention

The present invention relates to an information processing apparatus, a system, an information processing method, and a storage medium.

Description of the Related Art

In recent years, systems have been developed in which various logs stored in an information processing apparatus are transmitted to a server and the server is remotely accessed to quickly check log information.

Japanese Patent Application Laid-Open No. 2004-295303 discusses a technique that a web server transmits logs to a log collection server and the log collection server includes a log database. The web server includes a management file configured to manage the log transmission time and transmitted logs.

When a log file is transmitted from an information processing apparatus to the log collection server, in a case where, for example, a transmission error occurs, the log collection server cannot receive the log file. At this time, a problem arises in which the omission of a part of the log files on the log collection server cannot be recognized when the log files are remotely checked.

SUMMARY OF THE INVENTION

According to an aspect of the present invention, an information processing apparatus includes at least one processor and at least one memory coupled to the at least one processor which act as a first transmission control unit configured to perform control to transmit log information to a log collection server, a generation unit configured to generate statistic information about transmission of the log information by the first transmission control unit, and a second transmission control unit configured to perform control to transmit to the log collection server the statistic information generated by the generation unit.

Further features of the present invention will become apparent from the following description of exemplary embodiments with reference to the attached drawings.

DESCRIPTION OF THE EMBODIMENTS

Various exemplary embodiments of the present invention will be described below with reference to the drawings.

Figure 1A:
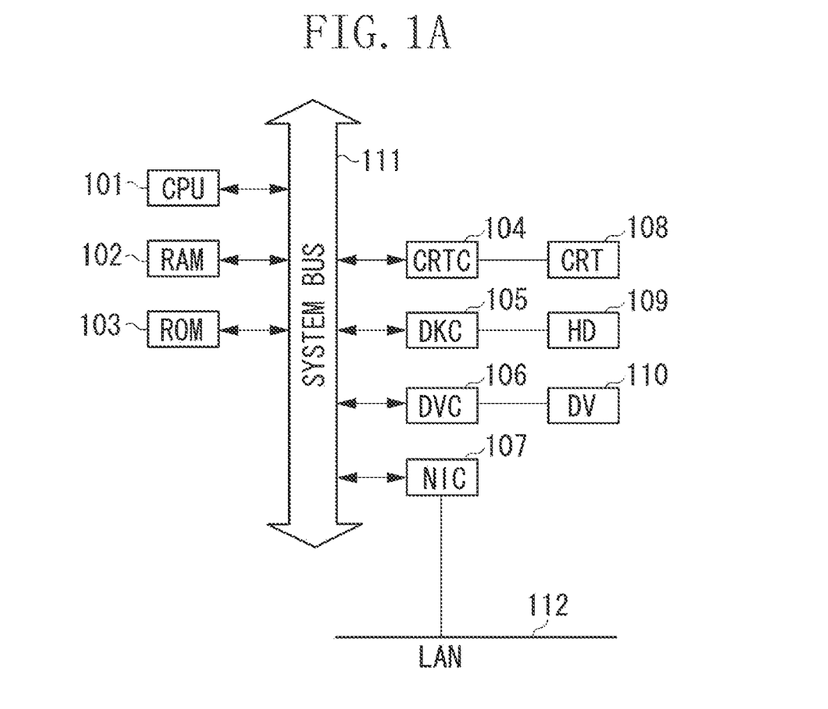
FIGS. 1A and 1B each illustrate an example of a hardware configuration of an information processing apparatus and a server, respectively, included in an information processing system.
Figure 1B:
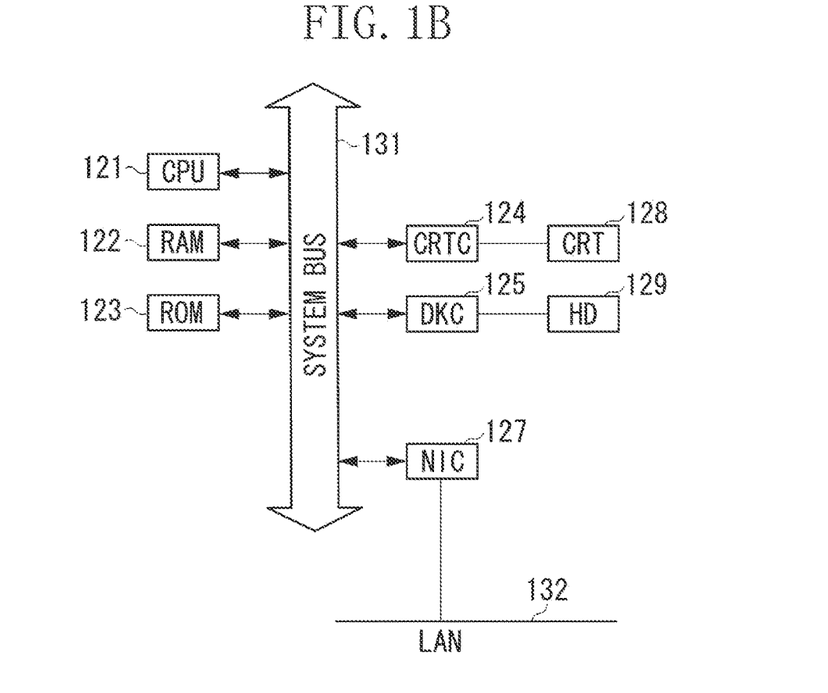

A first exemplary embodiment will be described below. FIGS. 1A and 1B each illustrate an example of a hardware configuration of an apparatus included in an information processing system. FIG. 1A illustrates an example of a hardware configuration of an information processing apparatus. In the example illustrated in FIG. 1A, the information processing apparatus performs network control and device (printer) control using one central processing unit (CPU). However, the information processing apparatus may include a plurality of CPUs, and the CPUs may each perform network control and device control. A CPU 101 executes a program stored in a read-only memory (ROM) 103 to comprehensively control each device connected to a system bus 111. Further, a random access memory (RAM) 102 functions as a main memory of the CPU 101, a work area, and the like. Further, the RAM 102 stores communication port settings values, and the like. A cathode ray tube (CRT) controller (CRTC) 104 controls a display on a CRT display (CRT) 108. A user can make copy settings and other settings using the CRT 108. A disk controller 105 controls a hard disk (HD) 109 configured to store logs described below, images, and various types of user data. A device controller (DVC) 106 controls a device (DV) 110 such as a printer and a scanner. A network interface card (NIC) 107 can perform communication with various types of servers via a local area network (LAN) 112.

While the information processing apparatus does not include a keyboard in the present exemplary embodiment, the information processing apparatus may include a keyboard. Further, the information processing apparatus does not have to include the HD 109 and may include a device capable of storing data, such as a universal serial bus (USB) memory, in place of the HD 109. Further, communication port setting values may be stored not in the RAM 102 but in a storage apparatus such as a hard disk drive (HDD).

The CPU 101 executes processing based on a program stored in the ROM 103, the HD 109, and the like to realize the following processing. Specifically, the software configuration of the information processing apparatus illustrated in FIG. 3, processing performed by the information processing apparatus in the sequence diagrams illustrated in FIGS. 6 and 11, and processing in the flow charts illustrated in FIGS. 9 and 10 described below are realized thereby.

FIG. 1B illustrates an example of the hardware configuration of a server such as a monitoring server and a Web Distributed Authoring and Versioning (WebDAV) server. In the example illustrated in FIG. 1B, the server performs network control and server control using one CPU. However, the server may include a plurality of CPUs, and the CPUs may each perform network control and server control.

A CPU 121 executes a program stored in a ROM 123 to comprehensively control each device connected to a system bus 131. Further, a RAM 122 functions as a main memory of the CPU 121, a work area, and the like. Further, the RAM 122 stores communication port settings, and the like. A CRTC 124 controls a display on a CRT display (CRT) 128. A user can make copy settings and the like using the CRT display 128. A disk controller 125 controls a HD 129 configured to store logs described below, images, and various types of user data. A NIC 127 can perform communication with other servers and an information processing apparatus via a LAN 132.

While the server does not include a keyboard in the present exemplary embodiment, the server may include a keyboard. Further, the server does not have to include the HD and may include a device capable of storing data, such as a USB memory, in place of the HD. Further, the communication port setting values may be stored not in the RAM 122 but in a storage device such as a HDD.

Figure 6:
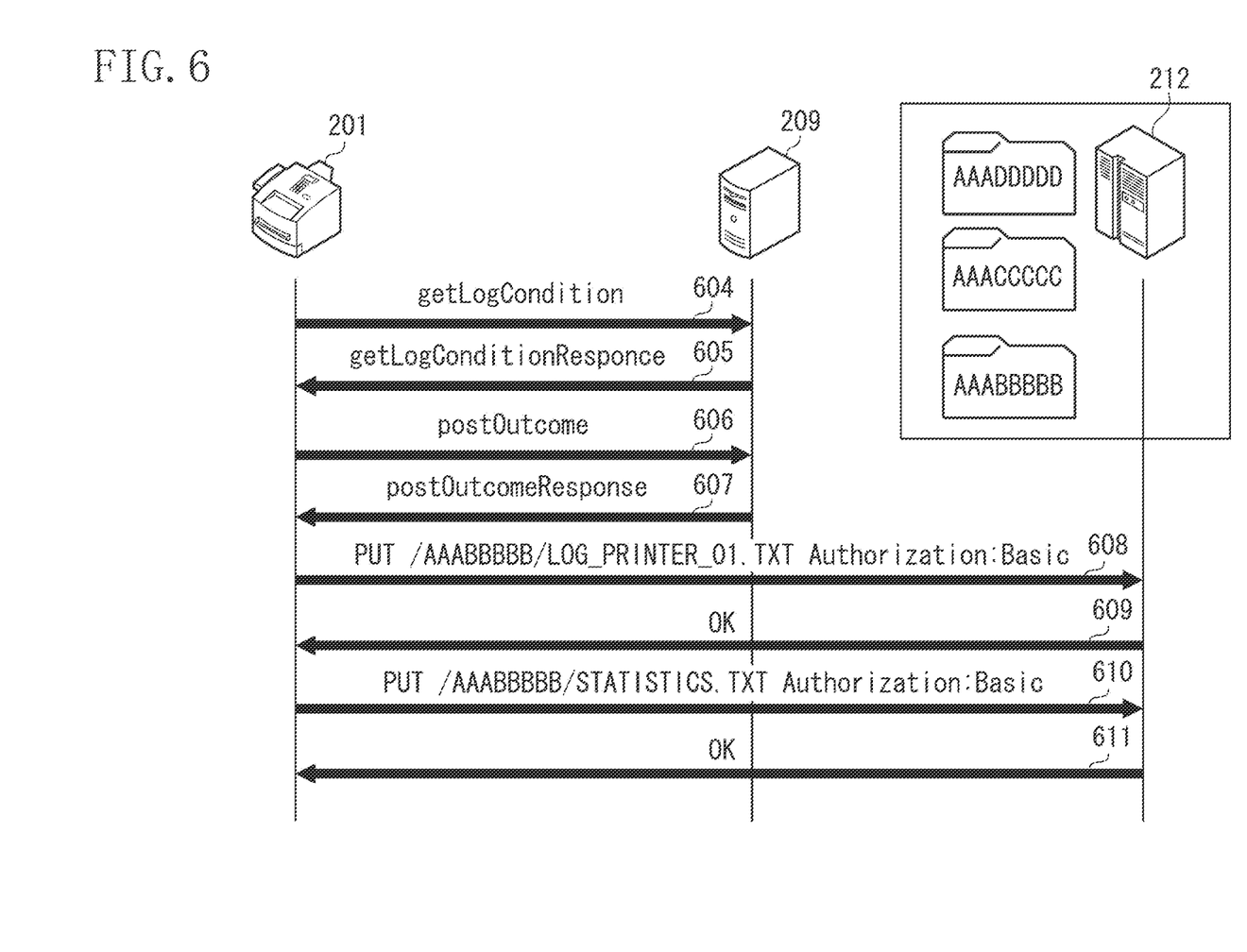
FIG. 6 illustrates an example of a communication sequence in the information processing system.
Figure 11:
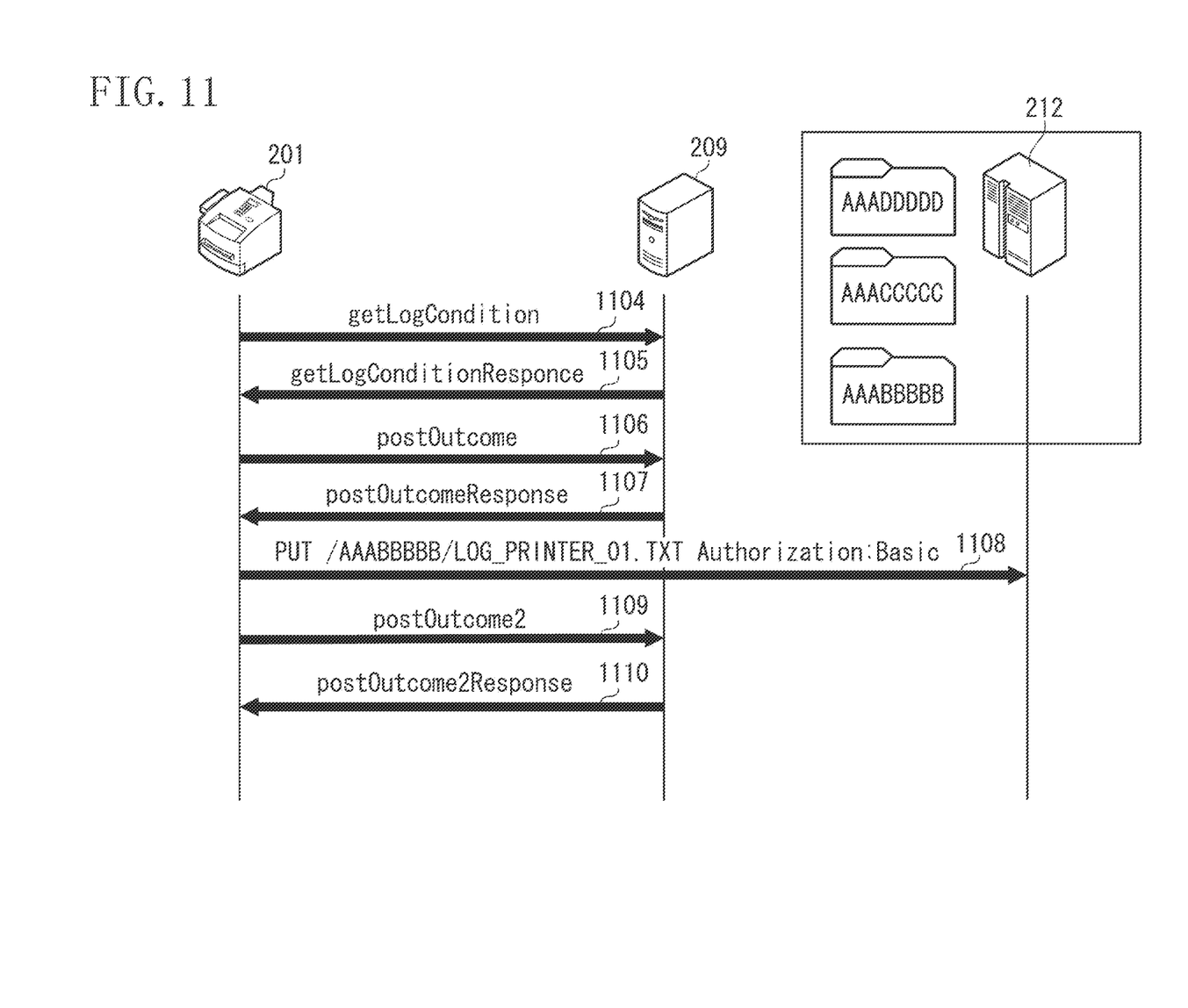
FIG. 11 illustrates an example of a communication sequence in a network.

The CPU 121 of the server executes processing based on a program stored in the ROM 123 or the HD 129 to realize a function of the server, processing of the server in the sequence diagrams illustrated in FIGS. 6 and 11, etc.

Figure 2:
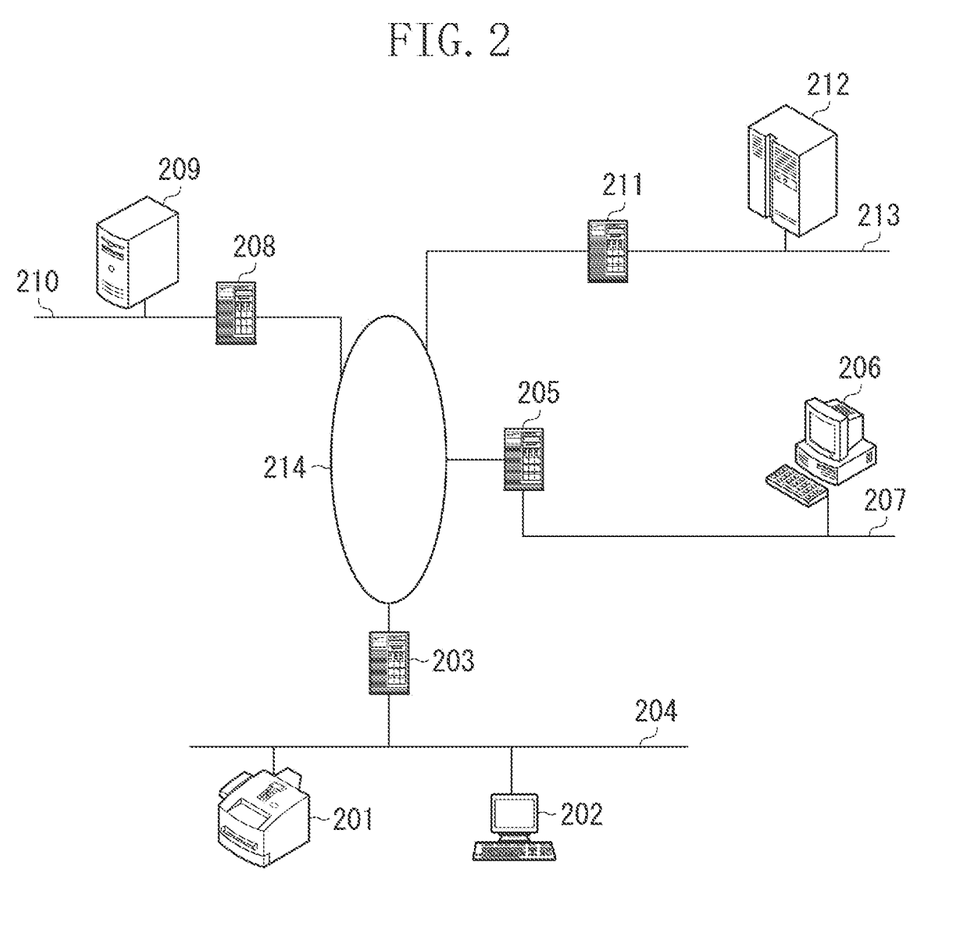
FIG. 2 illustrates an example of a system configuration of the information processing system.

FIG. 2 illustrates an example of a system configuration of the information processing system. An information processing apparatus 201 is an information processing apparatus such as a printer. A personal computer (PC) 202 is configured to transmit print data to the information processing apparatus 201 and perform status monitoring and the like. LANs 204, 207, 210, and 213 are local area networks. Proxy servers 203, 205, 208, and 211 are used for connecting to the Internet. A monitoring server 209 performs error monitoring and control on the information processing apparatus 201. Further, an Internet 214 indicates the entire Internet. A PC 206 is a PC capable of using a web browser and accessing the monitoring server 209 and a WebDAV server 212. A WebDAV protocol is an extended protocol of a Hypertext Transfer Protocol (HTTP) protocol and is a more suitable protocol for use on the Internet than the HTTP protocol in terms of security.

While the information processing system in which the apparatuses are connected via the Internet environment is described as an example in the present exemplary embodiment, an environment other than the Internet environment may be employed, and the proxy servers do not necessarily have to be included. Further, the number of information processing apparatuses and the number of PCs are not limited to the numbers specified as examples in the present exemplary embodiment. Further, while the WebDAV server 212 is provided in the example described in the present exemplary embodiment, in a case where a protocol (Server Message Block (SMB), File Transfer Protocol (FTP)) other than WebDAV is used, a server supporting the protocol may be provided. Further, the monitoring server 209 and the WebDAV server 212 may be implemented on the same computer.

Figure 3:
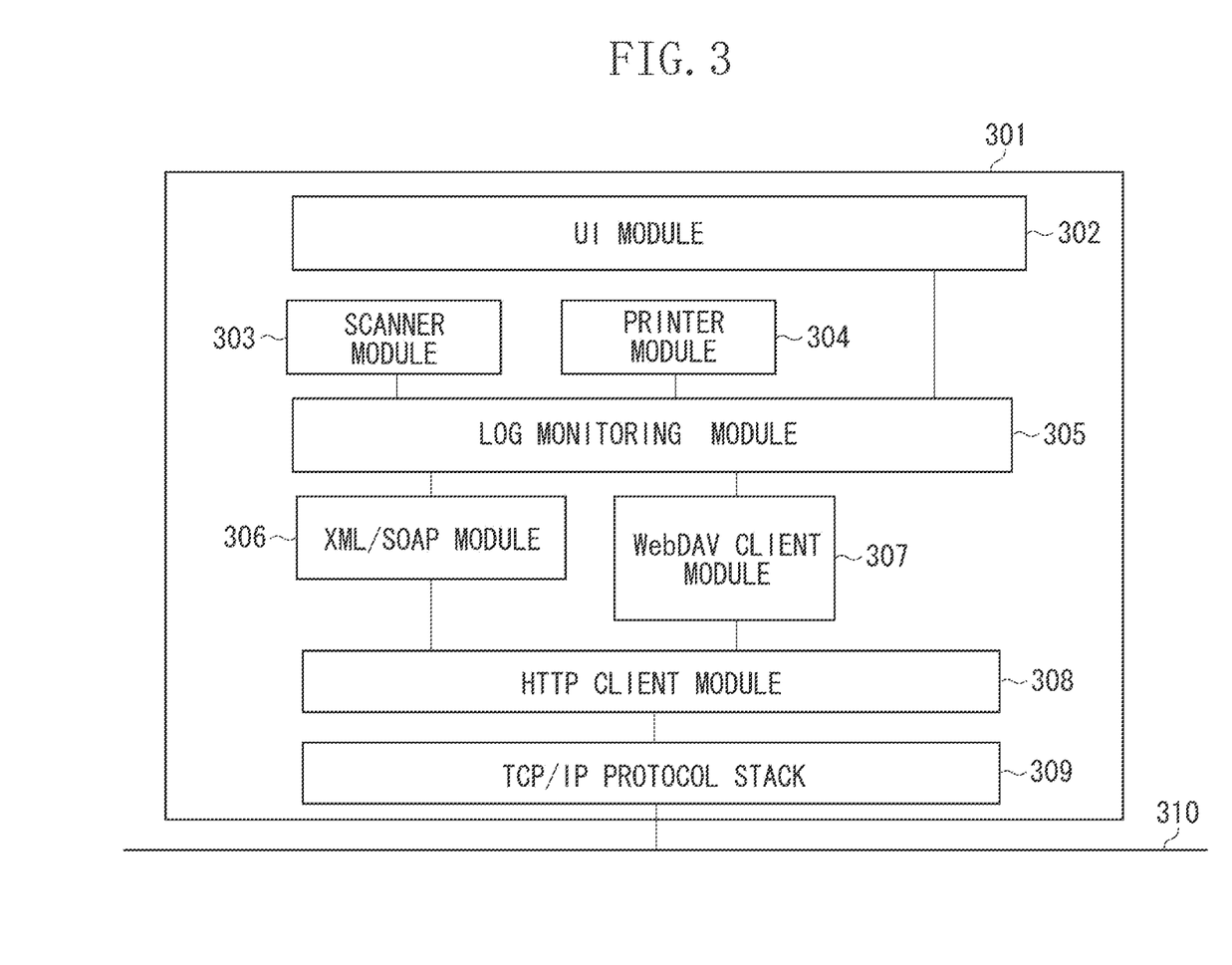
FIG. 3 illustrates an example of a software configuration of an information processing apparatus.

FIG. 3 illustrates an example of a software configuration of the information processing apparatus. A user interface (UI) module 302 controls a UI. A scanner module 303 controls a scanner of the DV 110. A printer module 304 controls a printer of the DV 110. A log monitoring module 305 monitors whether a log is written. An Extensible Markup Language-based Simple Object Access Protocol (XML/SOAP) module 306 is a module configured to control communication with the monitoring server 209. A WebDAV client module 307 is a module configured to control communication with the WebDAV server 212. An HTTP client module 308 controls the HTTP protocol. A Transmission Control Protocol over Internet Protocol (TCP/IP) protocol stack 309 is a module including a series of communication protocols for realizing TCP/IP communication. The information processing apparatus performs communication with an external server and other information processing apparatuses via a network 310. The various types of protocols illustrated in FIG. 3 are mere examples and may be other protocols.

Figure 4:
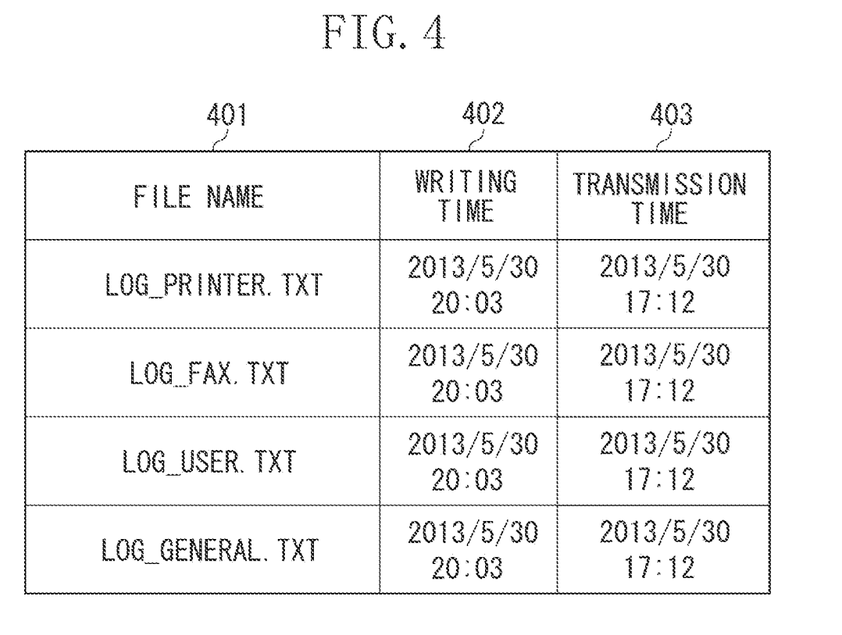
FIG. 4 illustrates an example of a log list in the information processing apparatus.

FIG. 4 illustrates an example of a log list in the information processing apparatus.

A file name 401 is the file name of a log. A writing time 402 indicates the time at which the log is generated and the time at which the log is updated. A transmission time 403 indicates the time at which the log is transmitted to the WebDAV server 212. The writing time 402 and the transmission time 403 are used as criteria to determine whether to transmit the log. In a case where the writing time 402 indicates a time later than the transmission time 403, the CPU 101 determines that the log needs to be transmitted.

The configuration of the log is a mere example, and the time and the date may be included in the file name of the log so that the writing time can be determined from the file name. Further, the CPU 101 may acquire a list of file names from the WebDAV server 212 and may determine that logs of the same file name do not have to be transmitted.

Figure 5:
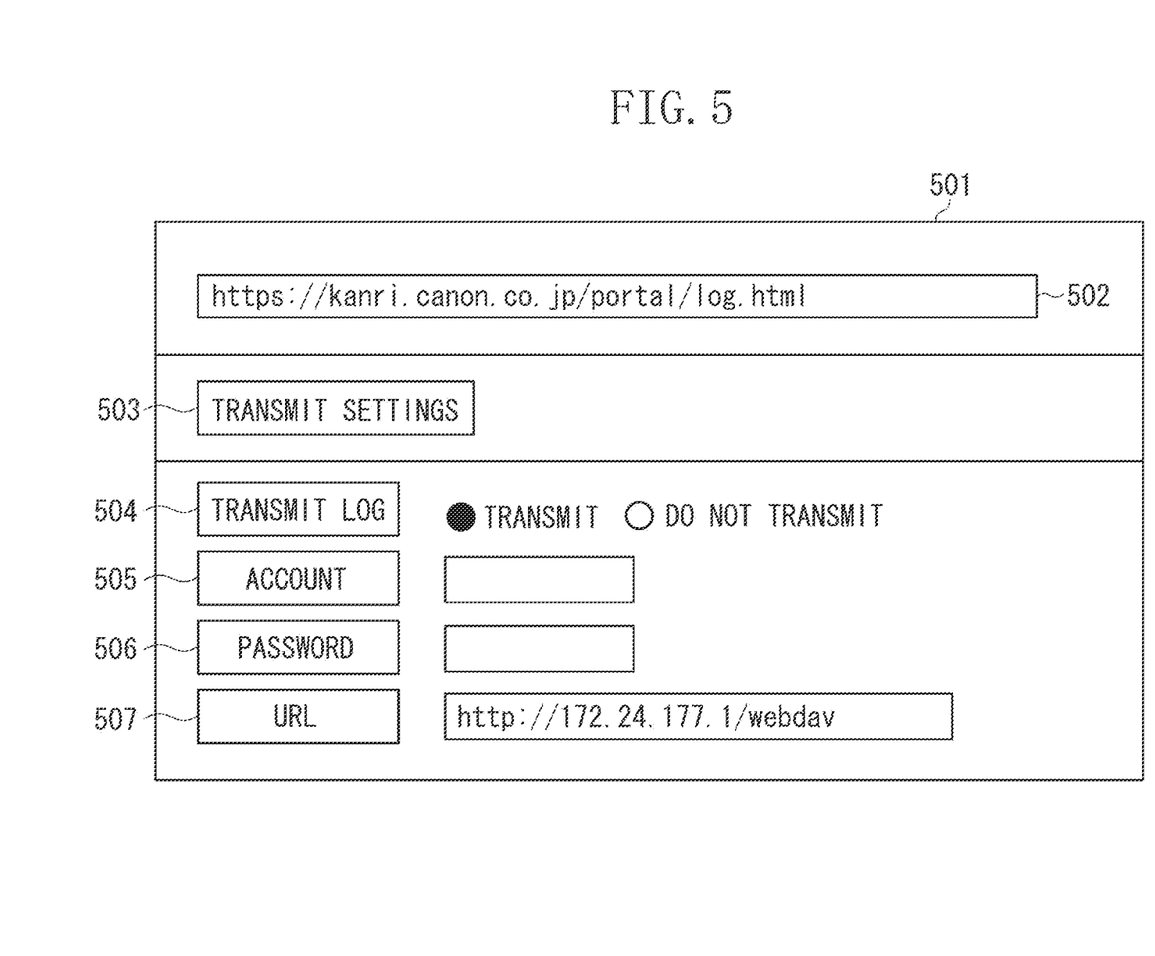
FIG. 5 illustrates an example of a user interface (UI) for providing a log transmission instruction to the information processing apparatus.

FIG. 5 illustrates an example of a UI for providing a log transmission instruction to the information processing apparatus.

A browser 501 is a browser on the PC 206 accessing the monitoring server 209. A uniform resource locator (URL) 502 is a URL of a web portal of the monitoring server 209. A button 503 is used for instructing the CPU of the PC 206 to transmit data selected or input in regions 504 to 507 to the information processing apparatus 201. The region 504 is used for selecting whether to transmit the log. The region 505 is used for inputting an account for accessing the WebDAV server 212. The region 506 is used for inputting a password corresponding to the account. The region 507 is used for inputting a URL to the WebDAV server 212. The CPU of the PC 206 receives the data selected or input in the regions 504 to 507, and if the CPU detects that the button 503 is selected, the CPU transmits the received data to the information processing apparatus 201.

The UI illustrated in FIG. 5 is a mere example, and the UI is not limited to the UI illustrated in FIG. 5 and may be any UI that enables an intended instruction to be set to the information processing apparatus 201.

FIG. 6 illustrates an example of a communication sequence in the information processing system.

The information processing apparatus 201 is managed by the monitoring server 209. The information processing apparatus 201 periodically acquires the log setting state of the log from the monitoring server 209 and transmits the log to a folder of a serial number ("AAABBBBB" in the present exemplary embodiment) of the information processing apparatus 201 in the WebDAV server 212. The information processing apparatus 201 transmits a getLogCondition 604 to the monitoring server 209 to periodically acquire the log setting state of the log. Then, the information processing apparatus 201 receives a getLogConditionResponse 605 to receive the setting state as a response from the monitoring server 209. Details of the getLogCondition 604 and the getLogConditionResponse 605 will be described below with reference to FIG. 7. The information processing apparatus 201 transmits a postOutcome 606 to notify the monitoring server 209 whether the log transmission processing is to be continued/stopped. The information processing apparatus 201 receives a postOutcomeResponse 607 as a response from the monitoring server 209. Further, the information processing apparatus 201 transmits a PUT 608 of the WebDAV protocol to transmit the log file to the WebDAV server 212. The authentication method is basic authentication. Since the basic authentication is a commonly-used authentication, a detailed sequence thereof is omitted. However, the authentication method is not limited to the basic authentication. The information processing apparatus 201 receives an OK 609 as a response from the WebDAV server 212. Thereafter, the information processing apparatus 201 transmits a PUT 610 of the WebDAV protocol to transmit a statistic information file to the WebDAV server 212. Details of the statistic information file are illustrated in FIG. 8 described below. The information processing apparatus 201 receives an OK 611 as a response from the WebDAV server 212.

While the sequence according to the WebDAV protocol is described in the present exemplary embodiment, the information processing system may perform communication using FTP, SMB, or other original protocols. Further, while the folder of the serial number is provided to identify the log of the information processing apparatus in the present exemplary embodiment, anything that can uniquely identify the log may be used such as a media access control (MAC) address instead of the serial number.

Figure 7:
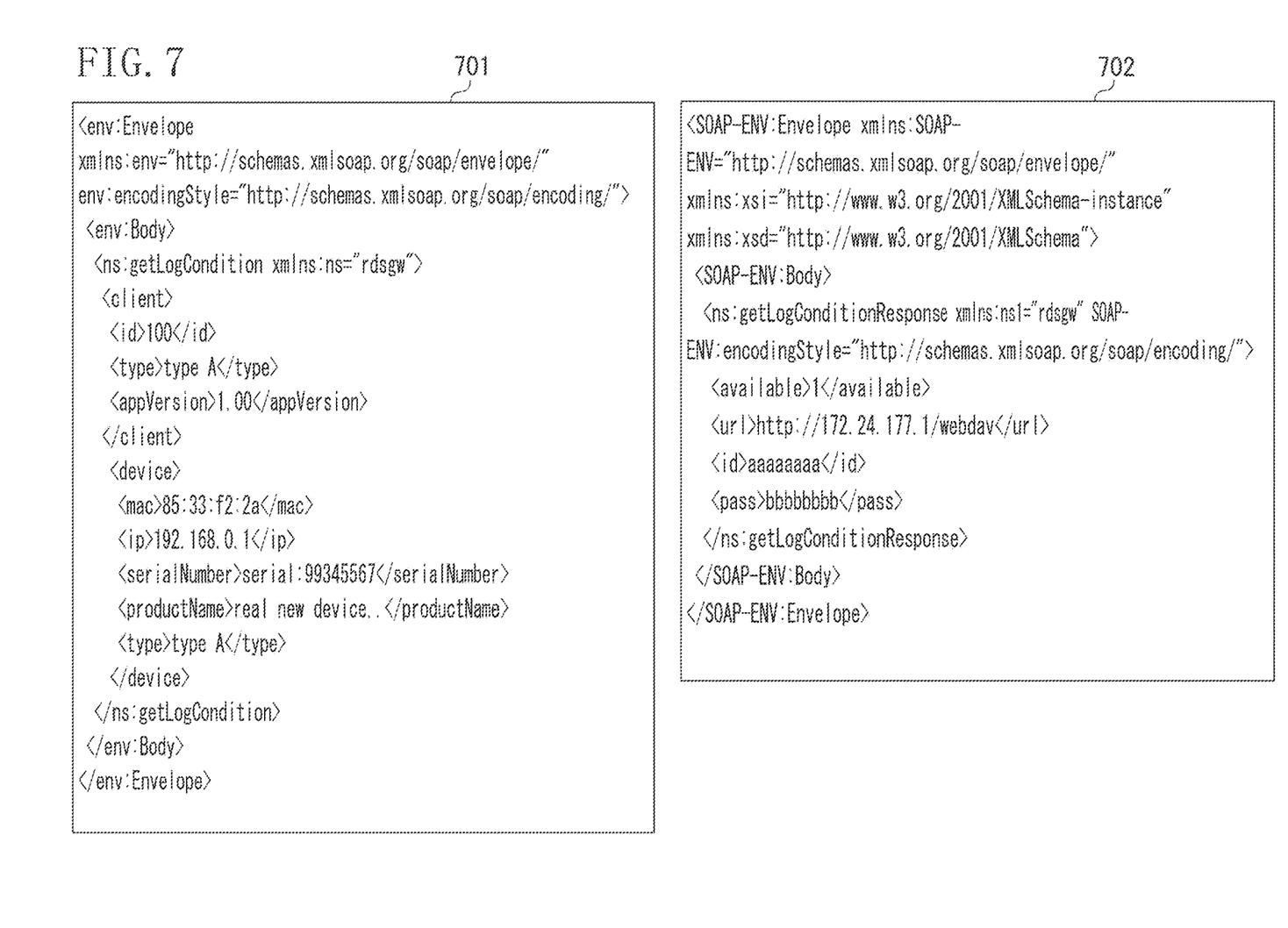
FIG. 7 illustrates Extensible Markup Language-based Simple Object Access Protocol (XML/SOAP) data for acquiring a log setting state.
Figure 8:
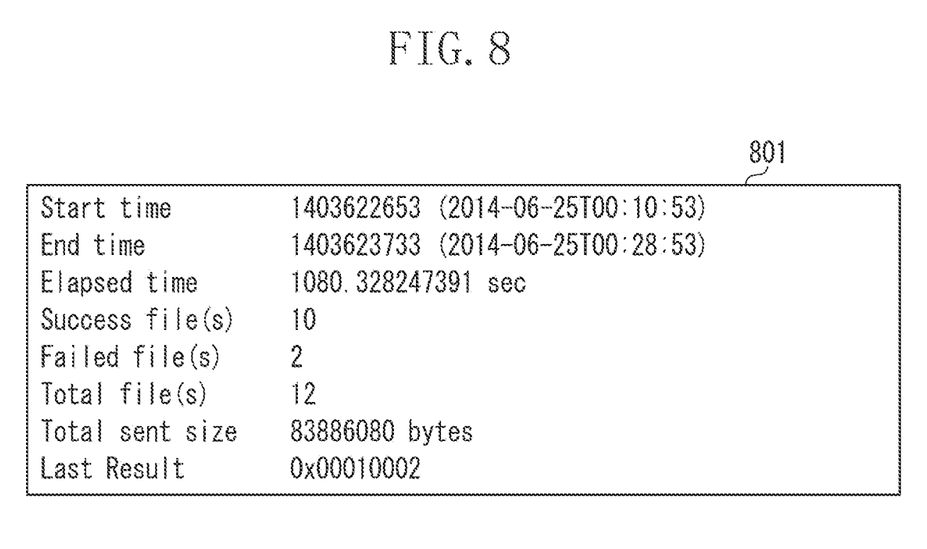
FIG. 8 illustrates a statistic information file.

FIG. 7 illustrates XML/SOAP data for acquiring the log setting state.

XML/SOAP data 701 is XML/SOAP data of the getLogCondition 604. The information processing apparatus 201 also transmits a client identifier for the identification of the information processing apparatus. XML/SOAP data 702 is XML/SOAP data of the getLogConditionResponse 605 that is a response to the getLogCondition 604. In the XML/SOAP data 702, the log transmission ON (value of "available"), the URL (value of "url"), the account (value of "id"), and the password (value of "pass") as set in FIG. 5 are contained.

While XML/SOAP is described as an example in the present exemplary embodiment, a data configuration other than XML/SOAP may be employed. Further, the XML/SOAP data is not limited to the example illustrated in FIG. 7 and may be any XML data as long as it indicates the same meaning.

FIG. 8 illustrates a statistic information file.

A statistic information file 801 is a statistic information file transmitted to the WebDAV server 212 by the information processing apparatus 201. In the statistic information file 801, the processing start time, the processing end time, the processing time, the number of successfully-transmitted files, the number of unsuccessfully-transmitted files, the total number of processed files, the total transmission size, and the cause of a latest error are described. The statistic information file 801 is not limited to the information illustrated in FIG. 8 and may be any statistic information file that indicates results of transmission of a plurality of log files included in the log information.

Figure 9:
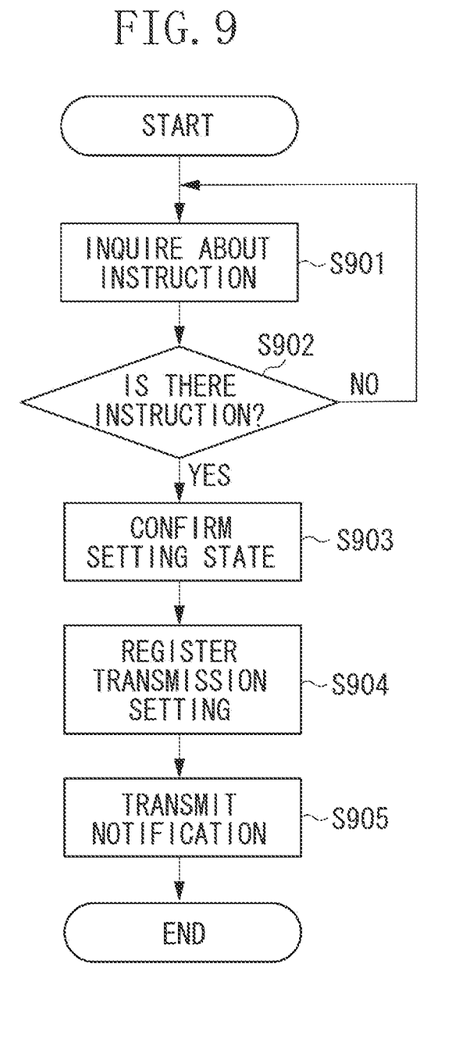
FIG. 9 is a flow chart illustrating an example of information processing for acquiring a log setting state.

FIG. 9 is a flow chart illustrating an example of information processing for acquiring the log setting state.

Operations performed by the information processing apparatus 201 according to the present exemplary embodiment will be described with reference to FIG. 9.

In step S901, the CPU 101 transmits a getLogCondition to the monitoring server 209 to inquire about an instruction.

In step S902, the CPU 101 determines whether there is an instruction based on whether a getLogConditionResponse is received. As a result of the determination, if the CPU 101 determines that there is an instruction (YES in step S902), the processing proceeds to step S903. On the other hand, if the CPU 101 determines that there is no instruction (NO in step S902), the processing returns to step S901. For example, the CPU 101 determines that there is an instruction if a getLogConditionResponse is received, whereas the CPU 101 determines that there is no instruction if no getLogConditionResponse is received.

In step S903, the CPU 101 confirms the setting state described in the getLogCondition.

In step S904, the CPU 101 registers in the information processing apparatus 201 the setting state confirmed in step S903 as a transmission setting.

In step S905, the CPU 101 transmits a postOutcome to the monitoring server 209 to transmit a notification indicating that the log transmission processing is to be continued.

Figure 10:
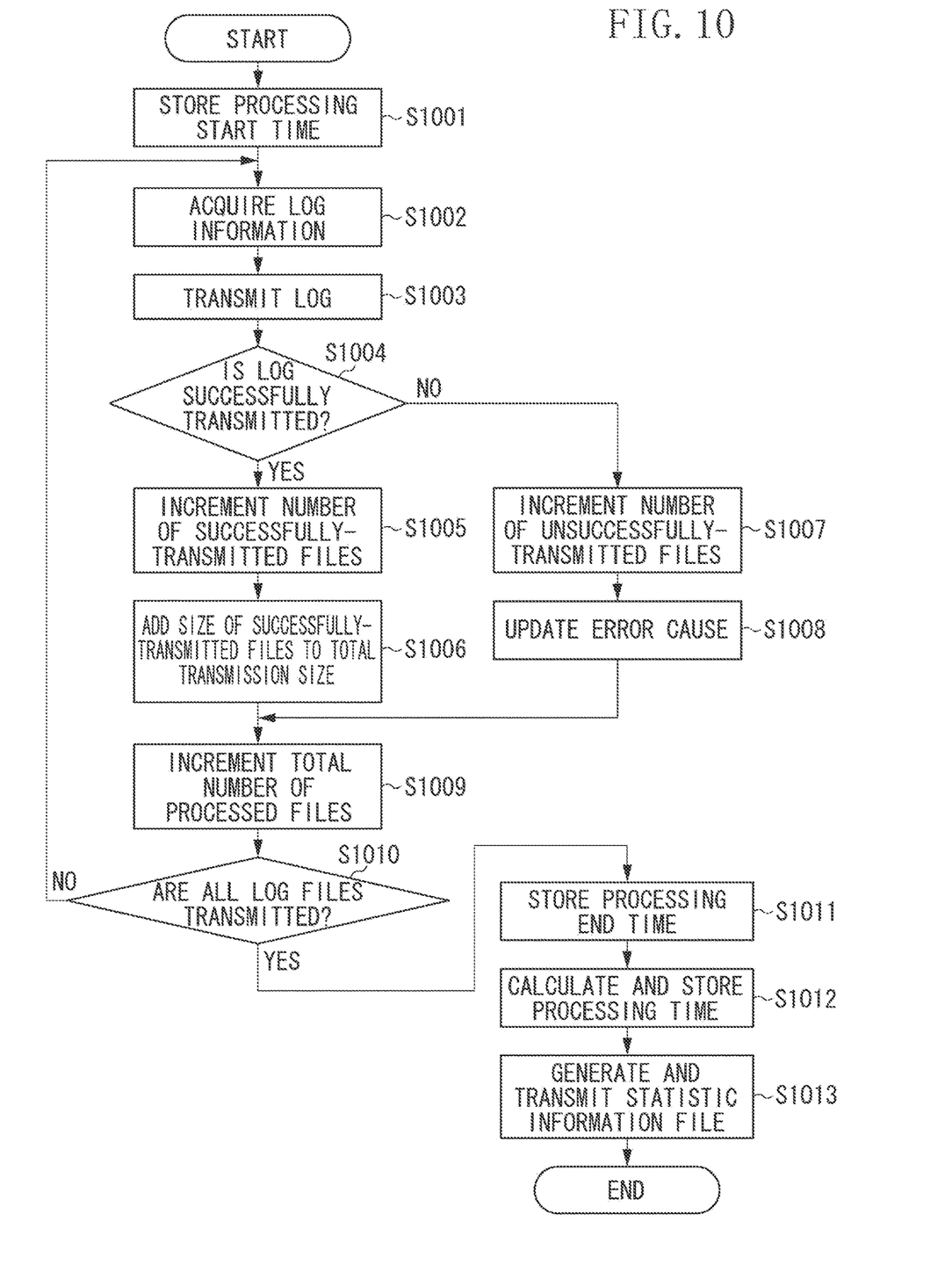
FIG. 10 is a flow chart illustrating an example of information processing for transmitting a log to a server apparatus.

FIG. 10 is a flow chart illustrating an example of information processing for transmitting a log to the server apparatus. The following describes operations of the information processing apparatus 201 according to the present exemplary embodiment with reference to FIG. 10.

In step S1001, the CPU 101 stores the processing start time.

In step S1002, the CPU 101 acquires log information as illustrated in FIG. 4.

In step S1003, the CPU 101 transmits a log to the WebDAV server 212.

In step S1004, the CPU 101 determines whether the log has been successfully transmitted. If the log has been successfully transmitted (YES in step S1004), the processing proceeds to step S1005. On the other hand, if the log has been unsuccessfully transmitted (NO in step S1004), the processing proceeds to step S1007.

In step S1005, the CPU 101 increments the number of successfully-transmitted files.

In step S1006, the CPU 101 adds the size of the successfully-transmitted files to the total transmission size. In step S1007, the CPU 101 increments the number of unsuccessfully-transmitted files.

In step S1008, the CPU 101 stores an error cause. In a case where an error cause has been already stored therein, the CPU 101 updates the stored error cause with the latest error cause.

In step S1009, the CPU 101 increments the total number of processed files.

In step S1010, the CPU 101 determines whether all log files have been transmitted. If all log files have been transmitted (YES in step S1010), the processing proceeds to step S1011. On the other hand, if not all log files have been transmitted (NO in step S1010), the processing returns to step S1002.

In step S1011, the CPU 101 stores the processing end time.

In step S1012, the CPU 101 calculates the processing time of all log files based on the processing start time stored in step S1001 and the processing end time stored in step S1011 and stores the calculated processing time.

In step S1013, the CPU 101 generates a statistic information file describing the processing start time, the processing end time, the processing time, the number of successfully-transmitted files, the number of unsuccessfully-transmitted files, the total number of processed files, the total transmission size, and the latest error cause as illustrated in FIG. 8. Then, the CPU 101 transmits the statistic information file with the file name "STATISTICS.TXT" to the WebDAV server 212.

The CPU 101 may store or may not store the statistic information file in the storage area of the information processing apparatus 201. Storing the statistic information file indicates that the file system of the information processing apparatus 201 is to be used. In the case where the statistic information file is not stored, the CPU 101 may generate a statistic information file using a buffer of the information processing apparatus 201 and transmits the generated statistic information file to the WebDAV server 212. The CPU 101 is able to transmit the statistic information file even in a case where an error occurs in the file system of the information processing apparatus 201 because the file system is not used.

The CPU 101 may access the file system after attempting to transmit all log files to check whether an error has occurred in the file system, and may include a result of the checking in the statistic information file.

While the example in which log transmission is performed only in a case an instruction is given from the monitoring server 209 is described in the present exemplary embodiment, the information processing apparatus 201 may periodically transmit a log to the WebDAV server 212. In this case, the CPU 101 may include the date and the time in the name of the statistic information file (statistic information file name), e.g., STATISTICS20150514192008.TXT. By changing the statistic information file name, overwriting can be prevented. Further, the CPU 101 may include neither the date nor the time in the statistic information file name in the case where an instruction is given from the monitoring server 209, whereas the CPU 101 may include the date and the time in the statistic information file name in the case where log transmission is performed periodically.

Further, the CPU 101 may limit the size of a log to be transmitted to the WebDAV server 212 and, for example, may stop the transmission when a log of a predetermined size has been transmitted. At this time, the CPU 101 may calculate the size of a log that has not been transmitted and may describe the calculated size as a remaining log size in the statistic information file.

A second exemplary embodiment will be described below.

In the first exemplary embodiment, the statistic information file is not stored in the WebDAV server 212 in the case where a transmission error occurs between the information processing apparatus 201 and the WebDAV server 212. Thus, it is impossible to remotely recognize the occurrence of the transmission error. In the present exemplary embodiment, the statistic information is transmitted to the monitoring server 209 so that the occurrence of the transmission error can be recognized remotely. Description of points that are similar to those described in the first exemplary embodiment is omitted, and points in which the present exemplary embodiment is different from the first exemplary embodiment will be described below.

Figure 12:
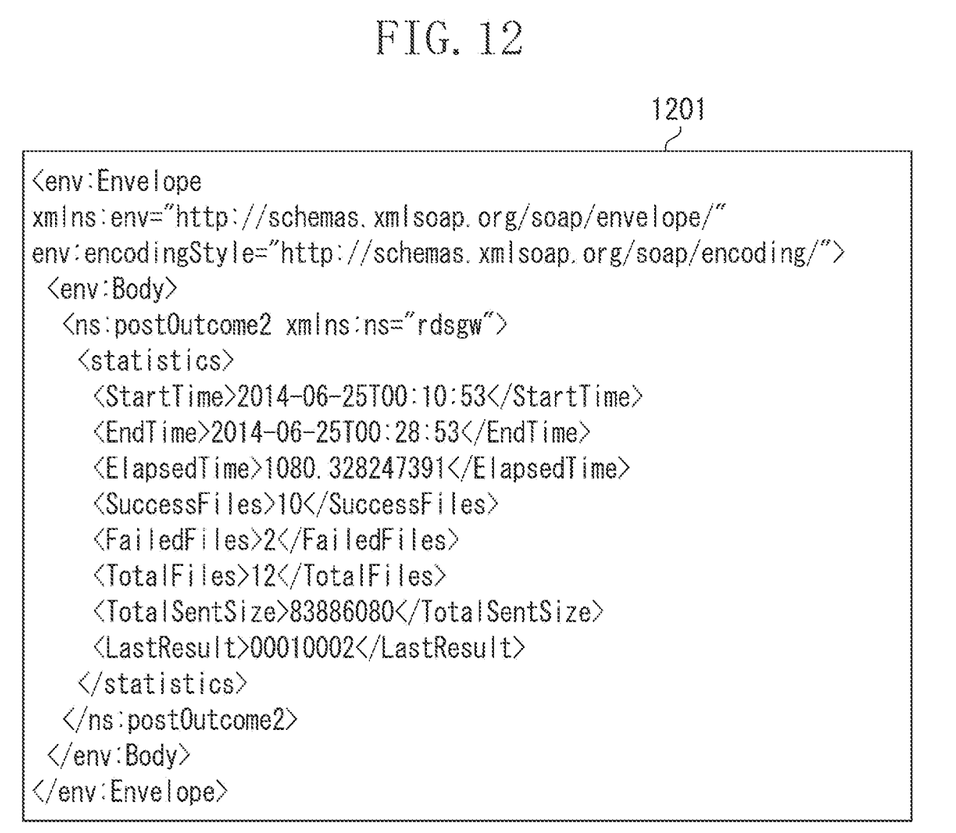
FIG. 12 illustrates an example of statistic information.

FIG. 11 illustrates an example of a communication sequence in the network. Processing from 1104 to 1107 is similar to processing from 604 to 607, so description thereof is omitted. The information processing apparatus 201 transmits a PUT 1108 of the WebDAV protocol to transmit a log file to the WebDAV server 212. In the present exemplary embodiment, a transmission error has occurred in the PUT 1108, and no response is transmitted from the WebDAV server 212. Then, the information processing apparatus 201 transmits a postOutcome2 1109 to transmit statistic information as illustrated in FIG. 12 to the monitoring server 209. The monitoring server 209 does not support the WebDAV protocol, so that the information processing apparatus 201 transmits the statistic information in XML/SOAP format. A postOutcome2Response 1110 is a response to the postOutcome2 1109.

FIG. 12 illustrates an example of statistic information.

Statistic information 1201 is statistic information transmitted with the postOutcome2 1109. This XML data contains the processing start time, the processing end time, the processing time, the number of successfully-transmitted files, the number of unsuccessfully-transmitted files, the total number of processed files, the total transmission size, and the latest error cause.

In the first or second exemplary embodiment, when log files of the log collection server are remotely checked, in a case where a part of the log files is omitted, the omission of the log files can be recognized.

While details of exemplary embodiments of the present invention have been described, the scope of the present invention is not limited to a particular exemplary embodiment. For example, while the information processing apparatus includes one NIC in the exemplary embodiments described above, the information processing apparatus may include a plurality of NICs.

In each of the exemplary embodiments described above, when log files of the log collection server are remotely checked, in a case where a part of the log files is omitted, the omission of the log files can be recognized.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-189963, filed Sep. 28, 2015, which is hereby incorporated by reference herein in its entirety.

What is claimed is:

1. An information processing apparatus comprising,
a memory for storing instructions, and
at least one processor executing the instructions causing the information processing apparatus to:
store start time of a transmission process of log information;
perform control to transmit one or more log files corresponding to the log information to a log collection server;
store end time of the transmission process of the log information after the transmission control about all of the one or more log files has been completed;
generate statistic information about the transmission of the log information after the end time has been stored, wherein the statistic information is information for recognizing that an unsuccessfully-transmitted file exists; and
perform control to transmit to the log collection server the generated statistic information,
wherein the statistic information
includes the stored start time and the stored end time.

2. The information processing apparatus according to claim 1,
wherein the instructions further cause the information processing apparatus to receive from a monitoring server an instruction including transmit settings related to the log information, and
wherein the control to transmit the log information to the log collection server is performed according to the received instruction.

3. The information processing apparatus according to claim 1, wherein the control to transmit the log information to the log collection server is periodically performed.

4. The information processing apparatus according to claim 2, wherein the instructions further cause the information processing apparatus to transmit, in a case where no response to the transmitted log information is received from the log collection server, the statistic information to the monitoring server, and
wherein, in a case where a response to the transmitted log information is received from the log collection server, the statistic information is transmitted to the log collection server.

5. The information processing apparatus according to claim 4, wherein, in a case where the statistic information is to be transmitted to the monitoring server, the statistic information is transmitted to the monitoring server according to Extensible Markup Language-based Simple Object Access Protocol (XML/SOAP).

6. The information processing apparatus according to claim 1, wherein the statistic information includes a cause of a latest error of unsuccessful transmission of the log information.

7. The information processing apparatus according to claim 3, wherein the statistic information includes a date and a time as a file name.

8. The information processing apparatus according to claim 1, wherein, in a case where a size of the log information to be transmitted to the log collection server is limited, the statistic information includes a size of untransmitted log information.

9. The information processing apparatus according to claim 1, wherein the log information and the statistic information are transmitted to the log collection server according to Web Distributed Authoring and Versioning (WebDAV) protocol.

10. The information processing apparatus according to claim 1, further comprising a scanner module for controlling a scanner and a printer module for controlling a printer.

11. The information processing apparatus according to claim 1, wherein the instructions further cause the information processing apparatus to store a number of the one or more log files corresponding to the log information, a number of one or more unsuccessfully-transmitted files and a total size of one or more successfully-transmitted files, and
wherein the statistic information includes the stored number of the one or more log files corresponding to the log information, the stored number of one or more unsuccessfully-transmitted files and the stored total size of one or more successfully-transmitted files.

12. An information processing method executed by an information processing apparatus, the information processing method comprising:
storing start time of a transmission process of log information;
transmitting one or more log files corresponding to the log information to a log collection server;
storing end time of the transmission process of the log information after the transmission control about all of the one or more log files has been completed;
generating statistic information about the transmission of the log information after the end time has been stored, wherein the statistic information is information for recognizing that an unsuccessfully-transmitted file exists; and
transmitting the generated statistic information to the log collection server,
wherein the statistic information
includes the stored start time and the stored end time.

13. A non-transitory computer readable storage medium storing a program that causes a computer to execute:
storing start time of a transmission process of log information;
transmitting one or more log files corresponding to the log information to a log collection server;
generating statistic information about the transmission of the log information after the end time has been stored, wherein the statistic information is information for recognizing that an unsuccessfully-transmitted file exists; and
transmitting the generated statistic information to the log collection server,
wherein the statistic information
includes the stored start time and the stored end time.

* * * * *